(12) United States Patent
Roscher et al.

(10) Patent No.: US 8,550,107 B2
(45) Date of Patent: Oct. 8, 2013

(54) VENTILATION DEVICE FOR THE FUEL TANK OF A VEHICLE

(75) Inventors: Richard Roscher, Langenaltheim (DE); Jürgen Theissler, Ansbach (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 1031 days.

(21) Appl. No.: 12/163,040

(22) Filed: Jun. 27, 2008

(65) Prior Publication Data
US 2009/0000668 A1 Jan. 1, 2009

(30) Foreign Application Priority Data

Jun. 27, 2007 (DE) .......................... 10 2007 030 039
Oct. 25, 2007 (DE) .......................... 10 2007 050 970

(51) Int. Cl.
F16K 24/04 (2006.01)

(52) U.S. Cl.
USPC .............................................. 137/202; 137/43

(58) Field of Classification Search
USPC ............. 137/39, 43, 202, 587, 177, 197, 199; 123/516, 518, 198 D, 520
See application file for complete search history.

(56) References Cited

U.S. PATENT DOCUMENTS

| 5,449,029 A | 9/1995 | Harris |
| 5,535,772 A | 7/1996 | Roetker et al. |
| 5,605,175 A * | 2/1997 | Bergsma et al. ............. 137/202 |
| 5,680,848 A | 10/1997 | Katoh et al. |
| 5,694,968 A | 12/1997 | Devall et al. |
| 5,944,044 A | 8/1999 | King et al. |
| 6,035,884 A | 3/2000 | King et al. |
| 6,170,510 B1 | 1/2001 | King et al. |
| 6,918,405 B2 | 7/2005 | Leonhardt |
| 6,959,720 B2 * | 11/2005 | Kurihara et al. ............. 137/202 |
| 7,114,513 B2 * | 10/2006 | Kurihara et al. ............. 137/202 |
| 7,147,017 B2 | 12/2006 | Leonhardt |
| 7,900,648 B2 * | 3/2011 | Rouxel et al. ................. 137/202 |
| 2001/0011538 A1 * | 8/2001 | Crary et al. ................... 137/202 |
| 2004/0149333 A1 * | 8/2004 | Johansen ...................... 137/202 |
| 2005/0126633 A1 | 6/2005 | Leonhardt |
| 2005/0257831 A1 * | 11/2005 | Kurihara et al. ............. 137/202 |
| 2005/0284539 A1 | 12/2005 | Leonhardt |
| 2007/0039648 A1 | 2/2007 | Simon et al. |
| 2007/0079872 A1 | 4/2007 | Leonhardt |
| 2010/0224262 A1 * | 9/2010 | Arnalsteen et al. ............. 137/43 |
| 2010/0224265 A1 | 9/2010 | Kobayashi et al. |

FOREIGN PATENT DOCUMENTS

| DE | 197 07 841 | 10/1997 |
| DE | 199 21 665 | 11/2000 |
| DE | 20 2005 020971 | 12/2006 |
| WO | WO 2006125758 | * 11/2006 |

OTHER PUBLICATIONS

European Search Report from EP 08010776 (3 pages).

* cited by examiner

Primary Examiner — John K Fristoe, Jr.
Assistant Examiner — Craig J Price
(74) Attorney, Agent, or Firm — Dority & Manning, P.A.

(57) ABSTRACT

A ventilation device includes a ventilation opening closable by a float in a valve housing interior, an inflow opening in an upper portion, at least one outflow opening in a lower portion that can be closed by a sealing element of a shut-off valve. A storage container is connected through a conduit to the valve housing interior so that fuel can flow from the housing interior into the storage container.

19 Claims, 7 Drawing Sheets

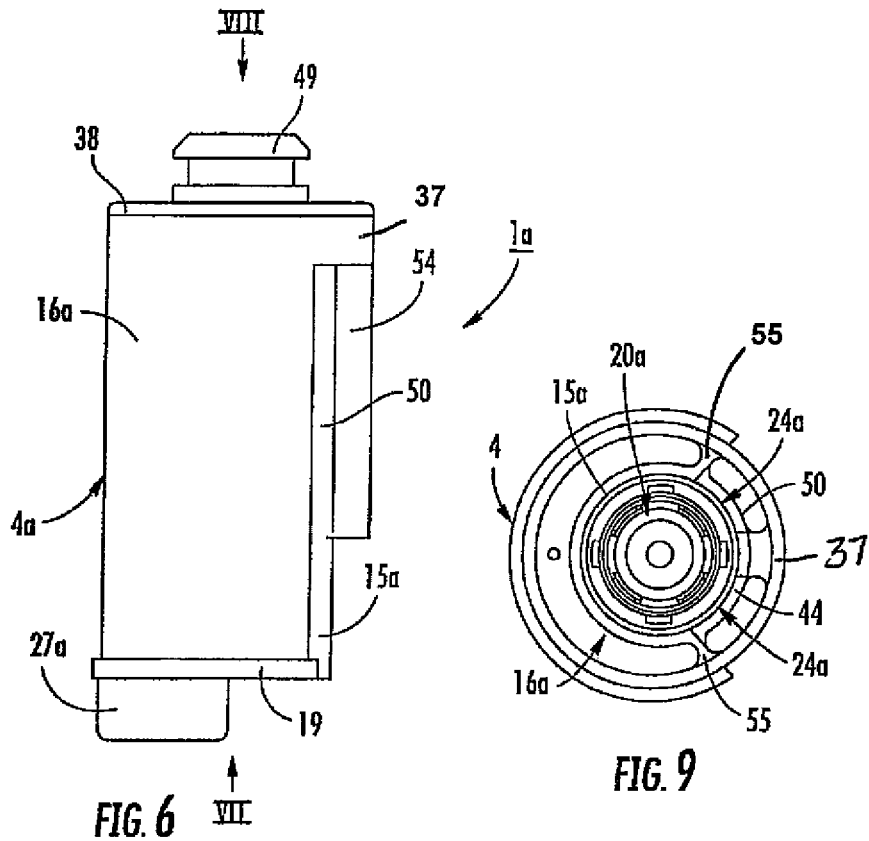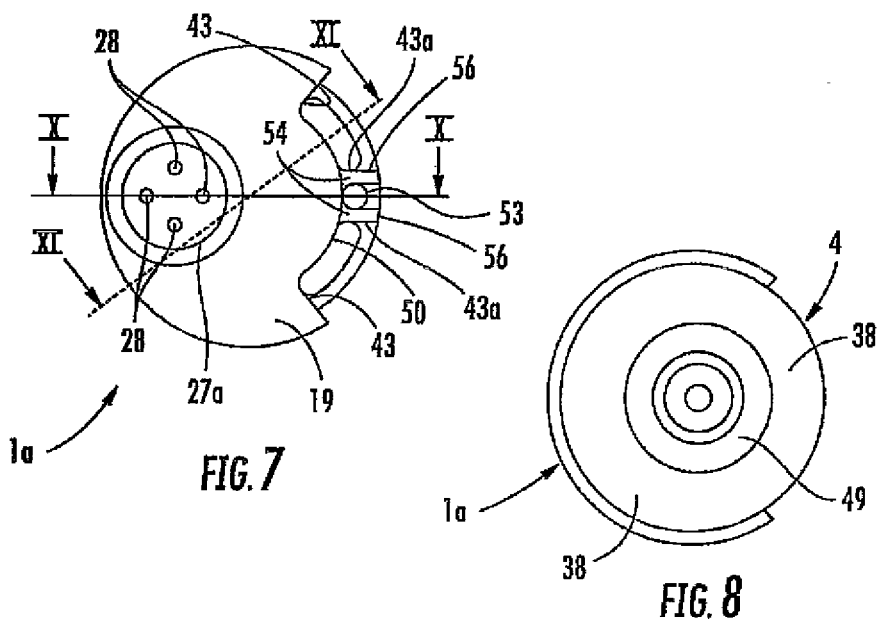

VENTILATION DEVICE FOR THE FUEL TANK OF A VEHICLE

FIELD

The disclosure refers to a ventilation device for the fuel tank of a vehicle.

BACKGROUND

Such ventilation devices may comprise a ventilation valve arranged in the fuel tank for aeration and ventilation purposes. Within the housing of the ventilation valve, an aeration and ventilation opening has been placed, which for simplification purposes will be subsequently named ventilation opening. The ventilation valve is located in an upper tank wall, and in this case the ventilation opening is connected to the ambient air. This ventilation valve has been designed as a float valve—in other words, a float that carries a sealing element and works together with the ventilation opening located in the float valve's housing that has been placed so it can move from a closed position to a resting position. In its resting position, the float is arranged in a lower position of the housing and the sealing element is located away from the ventilation opening.

Such valves are generally made for closing ventilation openings so fuel will not spill out, but they have the purpose of limiting the filling level of the fuel tank. During the filling up process (which takes place through a filling pipe found in the fuel tank), the float is lifted by the lifting forces exerted by the rising fuel. When the float finally reaches its closing position, it presses the sealing element with more or less substantial force against the ventilation opening. From that moment on, the gas displaced by the fuel flowing into the tank—a fuel-air mixture—can no longer escape the tank through the ventilation valve or the ventilation opening. As a result of the fuel flowing into the tank, the fuel level keeps rising at first, which leads to the overfilling of the tank. In other words, the fuel volume displaced by the float increases, so the float now dips into the fuel more than is necessary, which causes the corresponding increase of the force being exerted on the sealing element. Finally, the fuel that flows through the filling pipe and into the tank rises and as soon as the fuel reaches a certain level, the shut-off level, the fuel causes the pump nozzle to shut off.

Due to the overfilling that goes on during the filling up process and sometimes also due to the slowly increasing pressure within the tank when the vehicle is running, the re-opening of the ventilation opening is coupled with hysteresis (re-filling hysteresis). This means that the ventilation opening will remain closed until the fuel reaches a lower level through consumption, the so-called opening level. Depending on the horizontal cross-sectional area of the fuel tank, this level will be reached only when several liters of fuel (i.e. at least 6) have been consumed. This is not only disadvantageous because there is a potentially damaging inner pressure in the tank for a relatively long running period, but also because in the car rental business this effect makes it impossible to re-fill the car after short trips and gasoline consumption must then be paid either by the next customer or the car rental company.

With this assumption in mind, the task of the present disclosure is to suggest a ventilation device for the fuel tank of a vehicle that will be able to overcome the disadvantages described above.

SUMMARY

The present disclosure solves the previous drawbacks by utilizing a ventilation opening that comprises a ventilation valve equipped with a valve housing that has a ventilation opening. At least one inflow opening for letting gas in and fuel through has been arranged in an upper position of the valve housing, close to the ventilation opening, and there is at least one outflow opening in a lower position. Apart from the openings mentioned above, there are no more openings in the housing area between the openings.

A sealing element of a shut-off valve can close the valve housing such that no fuel can flow through the outflow opening and into the interior of the valve housing during the refilling process. How the shut-off valve will work is basically unimportant. The shut off valve may be electromagnetically activated, for example.

Also, the valve could be equipped with a floating sealing element. This kind of valve works reliably well with little manufacturing and mounting expense. The embodiment described above makes it possible for the fuel inside the tank to rise to a certain level that will be higher than the fuel or closing level needed for closing the ventilation opening within the valve housing. Since there is no fuel at first in the valve housing, the float remains in its resting position. Only when the fuel reaches the inflow opening located high above the closing level in the ventilation valve will the fuel be able to flow into the interior space of the valve housing and lift the float to its closing position. As described so far the present disclosure has the advantage of allowing a higher fuel filling level in the tank's interior space (i.e. taking better advantage of the tank volume). However, the disadvantage would be that a lot of fuel would have to be consumed while the vehicle is running to make the fuel level in the tank drop to a level in which the shut-off valve will release the outflow opening in the valve housing so the fuel can flow out into the tank's interior and the float can release the ventilation opening.

Additional design features now come into play that will substantially reduce the re-filling hysteresis: A storage container positioned in the tank's interior is connected to the interior of the valve housing through a connecting conduit in such a way that the fuel found therein can flow out into the storage container—in which case the flow cross-section of the connecting conduit is smaller than the opening cross-section of the inflow opening. The dimensions of the connecting conduit mentioned above ensure that the fuel flowing out into the storage container will lift the float to its closing position without having much effect on the closure of the ventilation opening. Once the ventilation opening has been closed, the rising fuel level in the filling pipe causes the pump nozzle to shut off. Furthermore, the flow cross-section of the connecting conduit has been designed in such a way that the fuel available in the interior of the valve housing will flow into the storage container within a certain time period (i.e. a few seconds). The float will then move back to its resting position so that—depending on the available capacity of the storage container—several re-filling steps are possible.

Since the storage container has limited capacity, it must be emptied, and an emptying device has been designed for such purpose. It may be, for example, a suction device such as a suction system already found in the fuel tank that includes a suction jet pump. However, it is better to empty the storage container via its outflow opening that may be closed with a sealing element of a shut-off valve.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures, in which:

FIGS. 1-5: Diagrammatic side sectional drawings showing the basic construction of the ventilation valve of a ventilation device according to the present disclosure and the way it works sequentially during filling;

FIG. 6: The side sectional view of a specific practical example of a ventilation valve;

FIG. 7: A bottom view of the valve of FIG. 6 from direction of arrow VII in FIG. 6;

FIG. 8: A top view of the valve of FIG. 6 from the direction of arrow VIII in FIG. 6;

FIG. 9: The view shown in FIG. 8, but with the lid of the ventilation valve removed;

DETAILED DESCRIPTION

Figure 1:
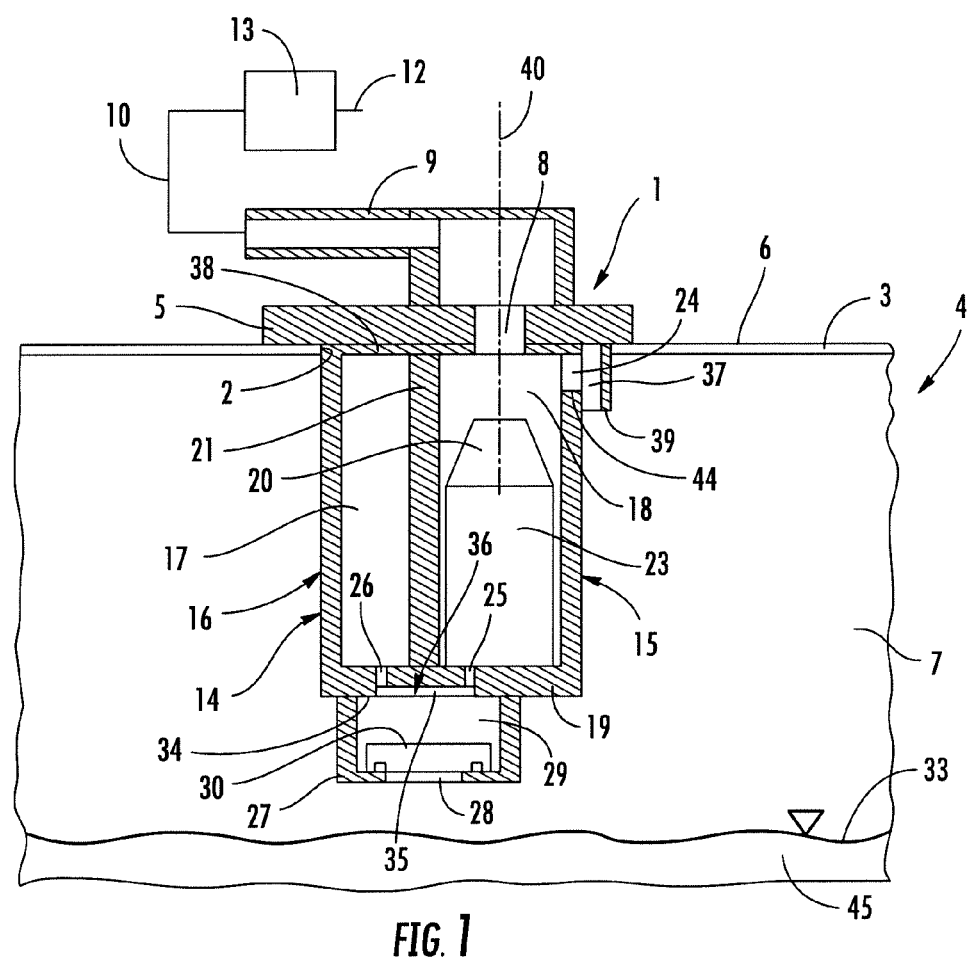

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

The ventilation valve 1 shown partially diagrammatically in the drawings has been placed on a mounting opening 2 in the upper wall 3 of a fuel tank 4. Ventilation valve 1 is supported by a flange 5 located on the external side 6 of the wall 3 of the fuel tank 4. The flange defines therethrough a ventilation opening 8 that serves to aerate and ventilate the tank interior 7 and carries a connecting piece 9 that is connected via a line 10 with an activated carbon container 13, in which case the latter is connected to the surroundings, for example, through a line 12. The ventilation system of the fuel tank 4 includes the connecting piece 9, the lines 10 and 12, the activated carbon container 13 and the conduit 14.

A housing 14 that includes a valve housing 15 and a storage container 16 integrally formed—preferably as an injection mold part—has been placed on the lower side of the flange 5. However, the storage container 16 can also be separately arranged within the fuel tank 4. The interior 17 of the storage container 16 is separated from the interior 18 of the valve housing 15 by a dividing wall 21 and connected to the ventilation system of the fuel tank 4. The underside of the valve housing 15 and the storage container 16 is closed by a common bottom 19. A sealing element 20 that carries a moveable float 23 from a resting position (FIG. 1) to a closed position (FIG. 2) has been arranged on the upper side of the valve housing 15. When the sealing element 20 is in the resting position, it releases the ventilation opening 8. When the sealing element 20 is in the closed position, the float 23 is pressed against the ventilation opening 8 due to buoyancy forces, thereby closing the ventilation opening 8.

The ventilation valve 1 has been designed in such a way that a gas exchange for aeration and ventilation purposes can only take place when the valve housing is in a position close to the upper tank wall 3 or to the ventilation opening 8. So this can take place, an opening is found in this area that will be known as an inflow opening 24 owing to a function explained in more detail below (i.e. to allow the inflow of fuel into the interior 7 of the valve housing 15). Additional openings that allow fuel to flow into the valve housing 15 do not exist.

Although there are outflow openings 25 and 26 in the bottom 19 of the housing 14 (their function will be explained below), fuel is prevented from flowing into these openings by a shut-off valve 27 placed externally on the bottom 19. On its lower side it has an opening 28 through which fuel can flow into its interior 29. A sealing element 30 shaped like a circular disk floats in the interior 29. When the fuel level 33 rises from the approximate point shown in FIG. 1, the sealing element 30 will float on the surface. The upper side of the sealing element 30 has been formed flatly and acts together with a sealing seat 34 that encompasses both outflow openings 25 and 26.

The sealing seat 34 and the sealing element 30 have been executed in such a way that in the closed position there is a hollow space connecting these openings between the sealing element 30 and the outflow openings 25 and 26. For example, there is a groove 35 in the bottom 19 that connects the outflow openings 25 and 26 with each other. The outflow openings 25 and 26 plus the groove 35 form a connecting conduit 36 that connects the interior 18 of the valve housing 15 with the interior 17 of the storage container 16.

In the practical example described here, the outflow openings 25 and 26 are controlled by a common shut-off valve or sealing element. In case of a separate storage container, a shut-off valve would be allocated to every opening.

An apron 37 placed at a radial distance from the inflow opening 24 and extending roughly vertically covers at least part of the opening area of the inflow opening 24 and is, for example, molded on the flange 5 or on a lid 38 that closes the housing 14. With respect to the mounting state of the ventilation valve 1, the lower edge 39 of the apron 37 runs mostly along a horizontal plane or a plane perpendicular to the middle longitudinal axis 40 of the valve housing 15. The apron 37 is molded on the lateral peripheral areas 43 of the inflow opening 24 or those opposite them in the circumferential direction of the valve housing 15 (see FIG. 7). The inflow opening 24 has a lower edge 44 that also runs along a plane that extends horizontally or perpendicularly to the middle longitudinal axis 40 of the valve housing 15.

Figure 2:
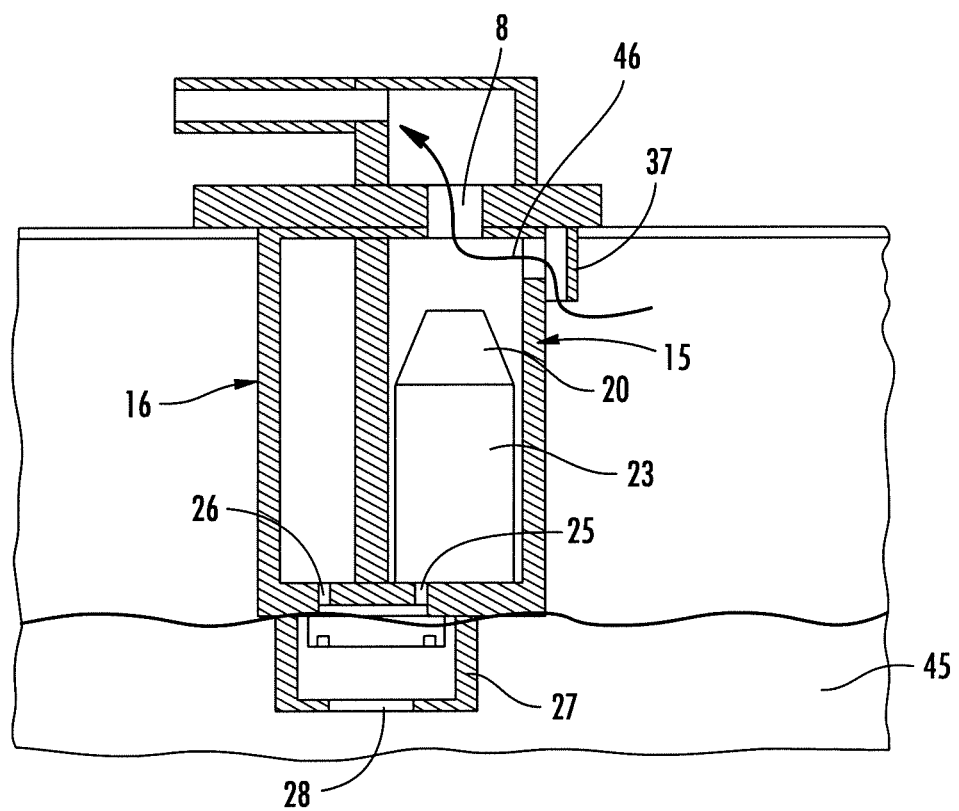

A fuel tank 4 equipped with a ventilation valve 1 of the kind described above works as follows: When, for example, the fuel level 33 starts rising from the scenario shown in FIG. 1 during the refilling process, the sealing element 30 of the shut-off valve 27 floats on the surface at first and then closes the outflow openings 25 and 26 so no fuel 45 can reach the storage container 16 or the valve housing 15 (FIG. 2). The gas vapor displaced by the rising fuel flows between the apron 37 and the valve housing 15 and into the inflow opening 24, thus leaving the fuel tank 4 through the ventilation opening 8 indicated by arrow 46 in FIG. 2. In the scenario shown in FIG. 3, the fuel has risen such that it has almost reached the lower edge 39 of the apron 37. Between the edge 39 and the fuel level 33a there is only a relatively narrow gap 47 left through which gas can flow.

Figure 3:
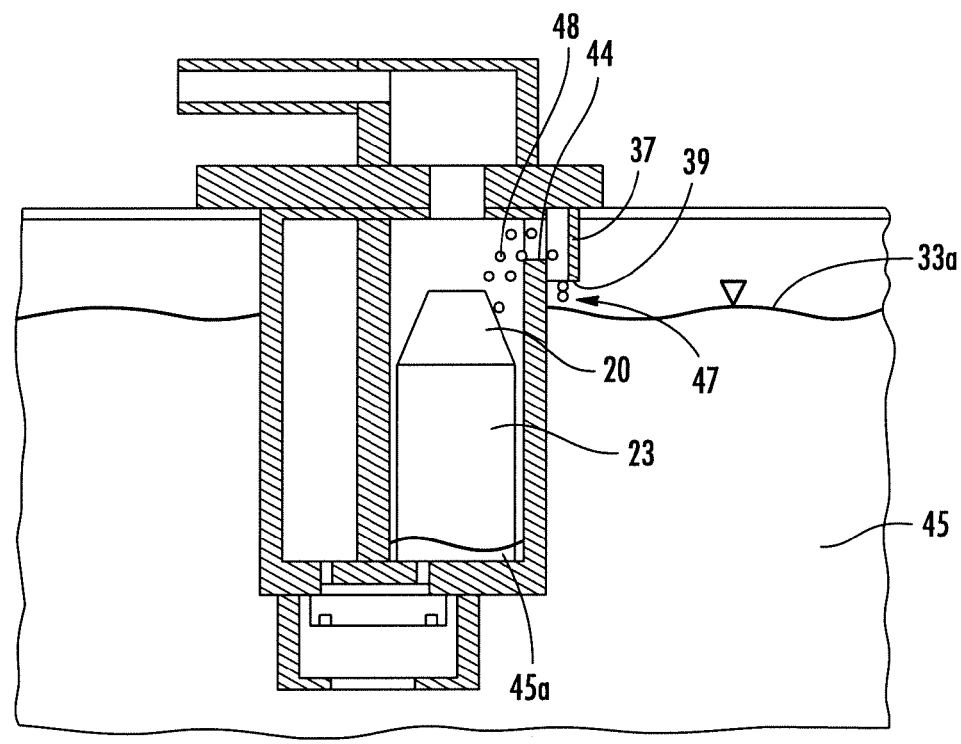
Figure 4:
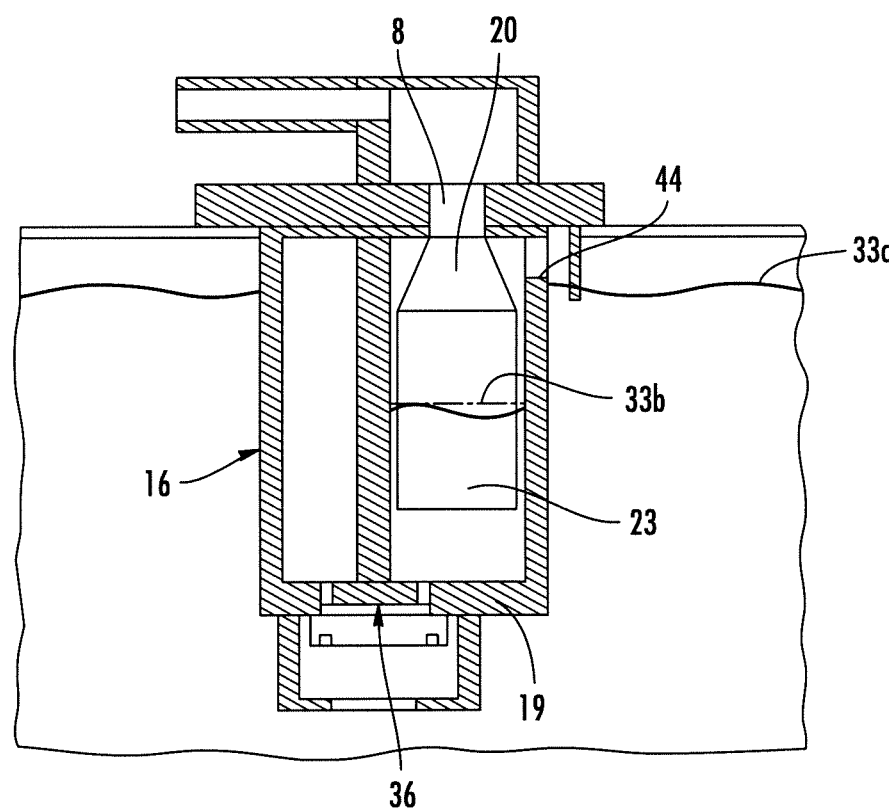

Owing to the ever narrowing gap 47, the flowing speed of the gas increases, so that fuel is then carried off for example in form of drops 48 and introduced into the valve housing 15, which starts filling with fuel 45a (FIG. 3). As a result of this, the float 23 floats on the surface and finally closes the ventilation opening 8 with its sealing element 20 (FIG. 4). Thus, a certain fuel level—the closing level 33b—is set.

Roughly from this point on, it is no longer necessary to introduce more fuel into the valve housing 15. In order to prevent or lower the possibility of fuel from getting into the closing position of the float 23 shown in FIG. 4, it may be useful for the apron 37 to extend downwards over the inflow opening 24 if in other words its lower edge 39 is arranged geometrically below the lower edge 44 of the inflow opening. Once the ventilation opening 8 has been closed, the inflowing fuel will increase the fuel filling level (fuel level 33c in FIG. 4) only marginally and this will lead to a gradual increase of the pressure within the tank and of the fuel in the filling pipe of the fuel tank (not shown), which will then cause the pump nozzle to shut off. Fuel flows through the connecting conduit 36 located in the bottom 19 to the storage container 16 such that the fuel level within housing 15 drops below the level 33b that causes the ventilation opening 8 to close (i.e., below the closing level).

Figure 5:
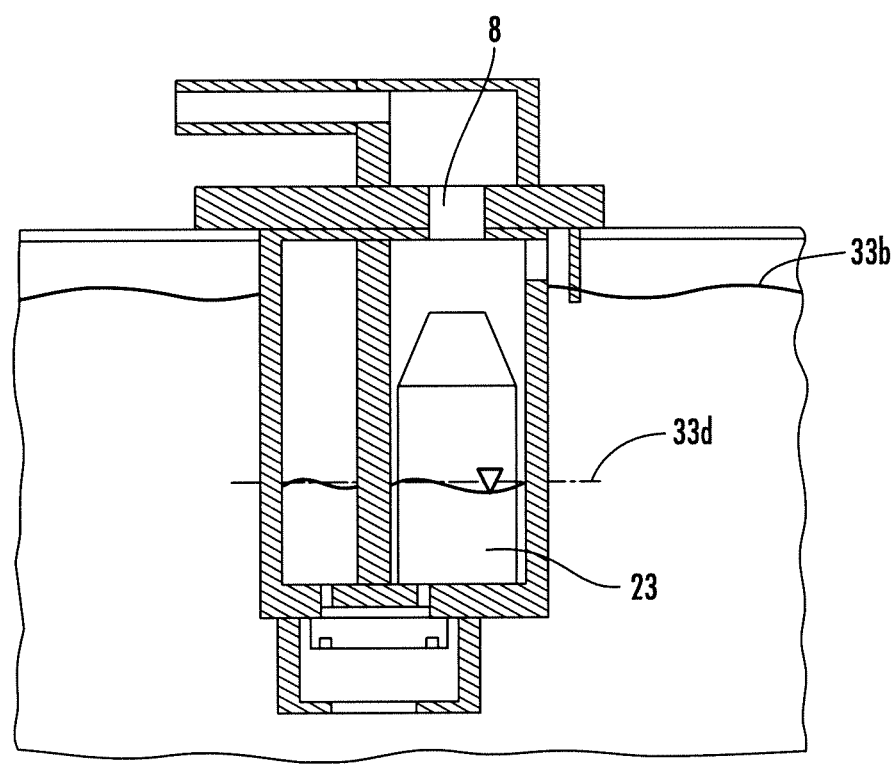

Eventually, the fuel levels 33d are equalized in the valve housing 15 and in the storage container 16 (FIG. 5). When this occurs, the float 23 will be in its resting position, thus releasing the ventilation opening 8. The flowing cross-sections of the outflow openings 25 and 26 and of the groove 35 that connects them have been chosen in such a way that the level compensation in the valve housing 15 and storage container 16 takes place relatively slowly, within a time period of several seconds. For example, only afterwards will refilling be possible for rounding up the payable amount to a full number.

The capacity of the storage container 16 can have dimensions that allow the level shown in FIG. 5 to be reached only after several refilling steps. If the vehicle is started when it is in the scenario shown in FIG. 5, then refilling is easily possible at any time owing to the fact that after a short drive the ventilation opening 8 has already been opened. However, it is also possible to actively empty the storage container 16—for example, by connecting it to a suction jet pump in the fuel tank whose functioning would depend, if need be, on the fuel level in the storage container.

FIGS. 6 to 11 show several views of a specific practical example of a ventilation valve 1a, but without the flange 5 and the connecting piece 9. A roughly cylindrical extension 49 has been mounted in the upper side, on the housing 4a, for fixing them in place. The storage container 16a and the valve housing 15a are components of a one-piece plastic injection molded part. The storage container 16a coaxially comprises the mostly cylindrically-shaped valve housing 15a in a section of its circumference (about 250°).

In the circumferential section 50 left open by the storage container 16a there are two inflow openings 24a separated from each other in circumferential direction. Between these inflow openings 24a, there are two webs 54 running parallel to the middle longitudinal axis 40 of the valve housing 15a that contain a groove 53 between them and protrude somewhat radially from the circumferential section 50. The circumferentially-pointing ends of the storage container are formed by wall webs 55 extending approximately in radial and axial direction. The areas of the wall webs 55 that protrude beyond the upper edge 44 of the inflow openings 24 towards the lid 38 of the housing 4a form the marginal areas 43 of the inflow openings 24a. Two additional marginal areas 43a are formed by the lateral walls 56 of the webs 54 pointing in circumferential direction.

Figure 10:
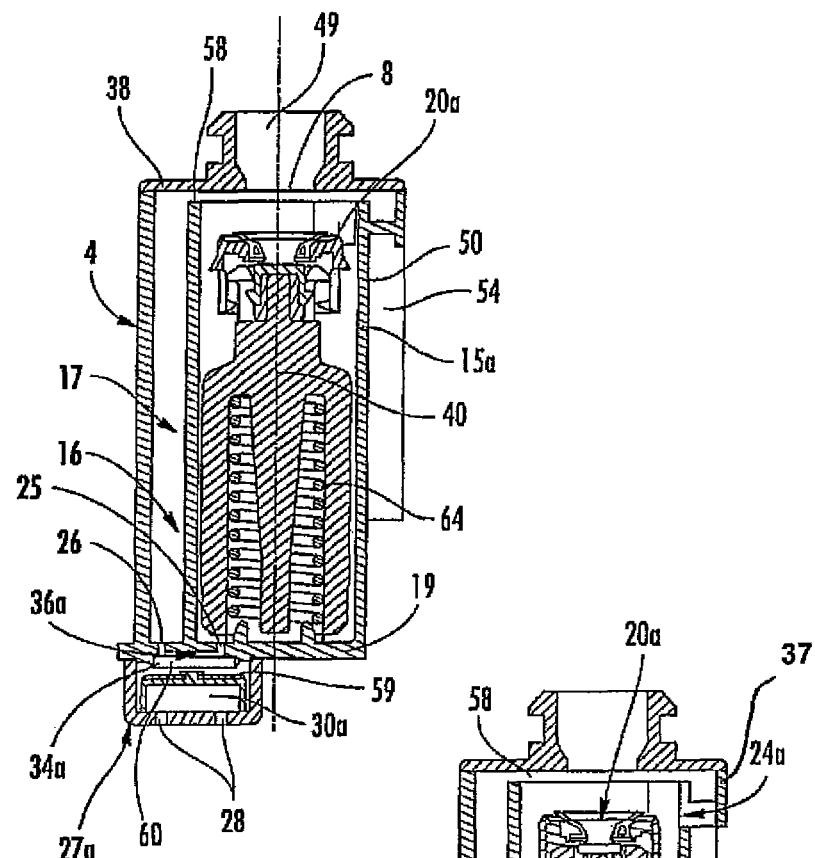
FIG. 10: A side sectional view of the valve of FIG. 6 taken along line X-X of FIG. 7.
Figure 11:
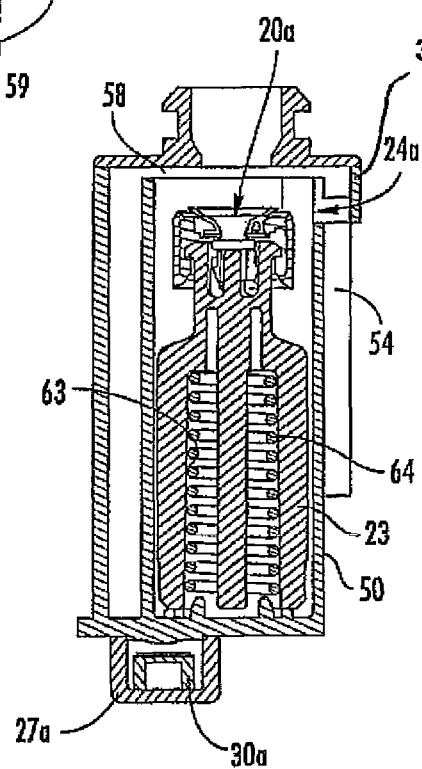
FIG. 11: A side sectional view of the valve of FIG. 6 taken along line XI-XI of FIG. 7.

As can be seen in FIGS. 10 and 11, an axial gap 58 is found between the valve housing 15a and a lid 38 that closes the housing 4. The interior 17 of the storage container 16 is connected to the ventilation system of the fuel tank, namely through the ventilation opening 8 of the ventilation valve 1. The easy inflow of fuel via the connecting conduit 36a is hereby made possible. The shut-off valve 27a has several openings 28. The sealing element 30a of the shut-off valve 27a is mostly pot-shaped, and its upper side carries a flat elastomeric disk 59. The sealing seat 34a located in the bottom 19 of the housing 4 protrudes rib-like from the bottom. As a result of this, a hollow space is created in the closed position between the sealing element 34a that forms the connecting conduit 36a together with the outflow openings 25 and 26. The float 23 has a central hollow space 63 in which a coil pressure spring 64 has been arranged that serves to ensure a roll-over function if the vehicle turns on its head in an accident. The sealing element 20a located in the upper side on the float 23 has been formed as a multi-stage (i.e. two-stage) sealing element.

While preferred embodiments of the disclosed subject matter have been described using specific terms, such description is for illustrative purposes only, and it is to be understood that changes and variations may be made without departing from the spirit or scope of the disclosure.

What is claimed is:

1. Ventilation device for a fuel tank of a vehicle, the ventilation device comprising:
   a ventilation valve with a valve housing that has a ventilation opening;
   a float within the valve housing moveable from a resting position to a closing position;
   a sealing element on an upper side of the float that works together with the ventilation opening, whereby the float is in a lower position inside the valve housing when it is in its resting position and the sealing element on the upper side of the float releases the ventilation opening, and whereby the float presses the sealing element on the upper side of the float against the ventilation opening when the float is in its closing position and closes the ventilation opening due to buoyancy forces;
   at least one inflow opening located in the valve housing in an upper position close to the ventilation opening for allowing gas and fuel to flow through;
   a shut-off valve;
   at least one outflow opening located in the valve housing in a lower position that can be closed by a sealing element of the shut-off valve so that fuel can only enter the valve housing during refueling via the inflow opening when the outflow opening is closed by the sealing element of the shut-off valve;
   a storage container connected through a connecting conduit with an area located below the inflow opening of the valve housing in such a way that fuel inside the interior of the valve housing can flow out of the valve housing and into the storage container when the outflow opening is closed by the sealing element of the shut-off valve, a cross-section of the connecting conduit being smaller than a cross-section of the inflow opening; and
   an emptying device used to remove fuel from the storage container.

2. Ventilation device according to claim 1, wherein the sealing element of the shut-off valve is a floating sealing element.

3. Ventilation device according to claim 1, wherein an apron that extends vertically and covers at least one part of the inflow opening is located with a radial separation from the inflow opening.

4. Ventilation device according to claim 3, wherein the apron is molded to lateral marginal areas adjacent to the inflow opening.

5. Ventilation device according to claim 3, wherein the emptying device comprises an outflow opening located in the storage container and the shut-off valve closes the outflow opening of the storage container with the sealing element of the shut-off valve.

6. Ventilation device according to claim 5, wherein the sealing element of the shut-off valve is a floating sealing element.

7. Ventilation device according to claim 1, wherein the storage container is connected to ambient air.

8. Ventilation device according to claim 7, wherein the storage container is connected to a ventilation and aeration system of the fuel tank.

9. Ventilation device according to claim 1, wherein the outflow opening of the valve housing and an outflow opening of the storage container can be closed by a common sealing element, the common sealing element being the sealing element of the shut-off valve.

10. Ventilation device according to claim 9, wherein the common sealing element acts together with a valve seat that encompasses the outflow openings, in which case the connecting conduit that connects the valve housing with the storage container is encompassed by the valve seat and extends between the outflow openings.

11. Ventilation device according to claim 9, wherein both outflow openings discharge into a lower side of a common bottom of the valve housing and the storage container.

12. Ventilation device according to claim 9, wherein the storage container encompasses at least one part of the valve housing which is cylindrically shaped.

13. Ventilation device according to claim 12, wherein at least one inflow opening of the valve housing is arranged in a circumferential section left open by the storage container.

14. Ventilation device according to claim 13, wherein an apron that extends vertically and covers at least one part of the inflow opening is located with a radial separation from the inflow opening, the apron extending between circumferentially-pointing ends of the storage container.

15. Ventilation device according to claim 12, wherein the storage container and the valve housing are formed unitarily with each other as one single piece.

16. A ventilation device for a fuel tank of a vehicle, the ventilation device comprising:
 a ventilation valve with a valve housing that has a ventilation opening, the ventilation valve being mounted to the fuel tank so that the ventilation opening can selectively vent the fuel tank;
 a float within the valve housing moveable from a lower, resting position to an upper, closing position, the float when in the resting position opening the ventilation opening, and when in the closing position closing the ventilation opening;
 at least one inflow opening located in the valve housing in an upper position for allowing gas and fuel to flow therethrough to float the float;
 a shut-off valve;
 at least one outflow opening located in the valve housing in a lower position closeable by the shut-off valve so that fuel can only enter the valve housing during refueling via the inflow opening when the outflow opening is closed by a sealing element;
 a storage container connected by a connecting conduit to the valve housing interior, the connecting conduit being located below the inflow opening of the valve housing in such a way that fuel inside the interior of the valve housing can flow out of the valve housing and into the storage container when the outflow opening is closed by the shut-off valve, a cross-section of the connecting conduit being smaller than a cross-section of the inflow opening; and
 an emptying device used to remove fuel from the storage container.

17. A ventilation device according to claim 16, wherein the outflow opening of the valve housing and an outflow opening of the storage container can be closed to the interior of the fuel tank by the shut-off valve.

18. A ventilation device according to claim 17, wherein the shut-off valve acts together with a valve seat that encompasses the outflow openings, in which case the connecting conduit is arranged within an area encompassed by the valve seat and extends between the outflow openings.

19. A ventilation device according to claim 18, wherein an apron that extends vertically and covers at least one part of the inflow opening is located with a radial separation from the inflow opening.

* * * * *